United States Patent [19]

Mioche

[11] Patent Number: 4,568,504

[45] Date of Patent: Feb. 4, 1986

[54] METHOD FOR OBTAINING STRIPS FROM RUBBER

[75] Inventor: Robert Mioche, Nohanent, France

[73] Assignee: Compagnie Generale des Etablissements Michelin, Clermont-Ferrand, France

[21] Appl. No.: 688,293

[22] Filed: Jan. 2, 1985

Related U.S. Application Data

[62] Division of Ser. No. 474,124, Mar. 10, 1983, Pat. No. 4,515,548.

[30] Foreign Application Priority Data

Apr. 7, 1982 [FR] France ................................ 82 06226

[51] Int. Cl.[4] ................................................ B29C 39/02

[52] U.S. Cl. ................................ 264/158; 264/331.13

[58] Field of Search .................... 264/158, 331.13, 306, 264/301, 298, 201; 425/224, 308, 311; 83/871

[56] References Cited

U.S. PATENT DOCUMENTS

| | | | |
|---|---|---|---|
| 1,301,065 | 4/1919 | Kunst | 425/311 |
| 2,340,243 | 1/1944 | Beal . | |
| 4,392,801 | 7/1983 | Meyer | 425/71 |

FOREIGN PATENT DOCUMENTS

| | | |
|---|---|---|
| 1168367 | 10/1969 | United Kingdom . |

*Primary Examiner*—James Lowe
*Attorney, Agent, or Firm*—Brumbaugh, Graves, Donohue & Raymond

[57] ABSTRACT

A method for obtaining strips from a material, such as a latex coagulum, is characterized by floating the material in a fluid, such as water, and cutting the material into strips from a portion of the material located above the fluid, for example, by means of a band saw.

6 Claims, 3 Drawing Figures

METHOD FOR OBTAINING STRIPS FROM RUBBER

This application is a division of application Ser. No. 474,124, filed on Mar. 10, 1983, now U.S. Pat. No. 4,515,548.

The present invention relates to a method for obtaining strips from a material, which strips may be of small thickness as compared with their other dimensions, but without this being necessary.

By way of example, this material may be of rubber, in particular a rubber obtained by coagulation from a latex, the material being in this case commonly referred to as "coagulum." It should be noted, however, that the invention can be applied to other materials, for instance, plastics, foodstuffs, wood, mineral materials and metals.

The known methods employed in natural rubber plantations consist of coagulating the latex in elongated tanks of slight depth. Strips of latex coagulum of a thickness of about 10 cm to 15 cm are thus obtained directly. These strips then undergo the known treatments, for instance, a crushing or granulation followed by drying. This method for obtaining strips has the following drawbacks:

in view of the slight depth of the tanks, the coagulation installations require very large areas, which raises problems as to location and makes very high investments necessary;

upon the coagulation, the surface/volume ratio of the coagulum is large so that the surface thereof in contact with the air is large, which results in very substantial superficial oxidation of the coagulum and therefore in degradation of the material and a detrimental change in quality.

In order to attempt to eliminate these drawbacks, efforts have been made to obtain thick blocks upon the coagulation and then cut these blocks into strips. Experience shows that this cutting operation encounters substantial difficulties due, in particular, to the flexibility, lack of rigidity and low tensile strength of the coagulum. The handling devices used for the cutting lead, for example, to a crushing or tearing of the coagulum, which raises complex problems of manufacture and results in substantial variations in quality.

The object of the present invention is to overcome these drawbacks. Therefore, the method of the invention for obtaining strips from a material is characterized by floating the material in a fluid and cutting the material into strips from a portion of the material located above the fluid.

The invention also concerns an arrangement for the carrying out of the method of the invention, as well as the strips obtained by the method and with the arrangement of the invention.

The figures of the drawing, all of which are schematic, together with their description and the examples which follow, are intended merely to illustrate the invention and facilitate an understanding thereof without, however, limiting its scope.

Figure 1:
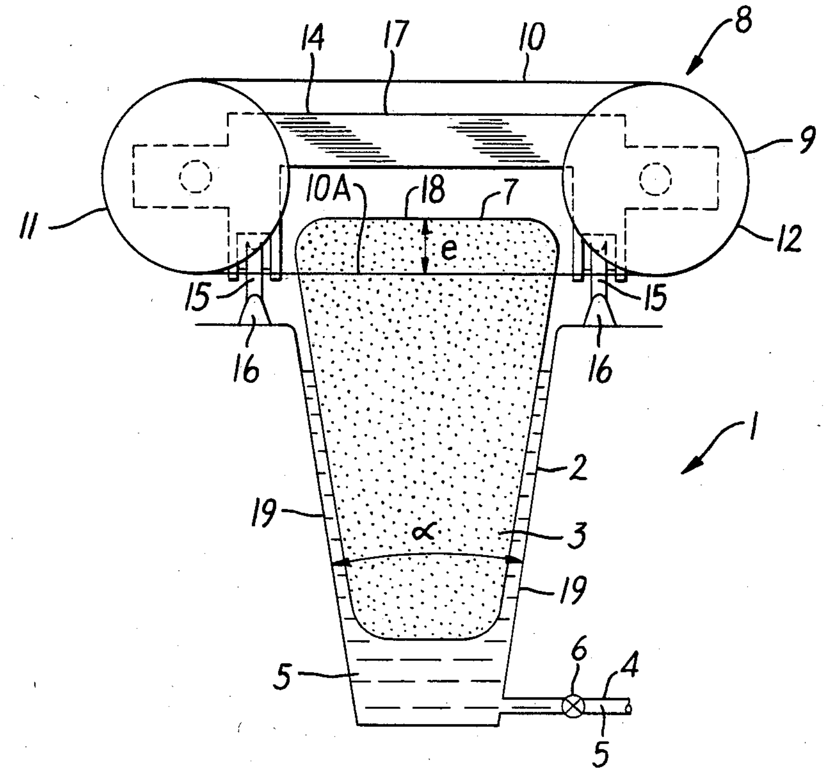
FIG. 1 shows an arrangement in accordance with the invention seen in elevational cross section, the cross sectional plane being represented by the line I—I in FIG. 2.
Figure 2:
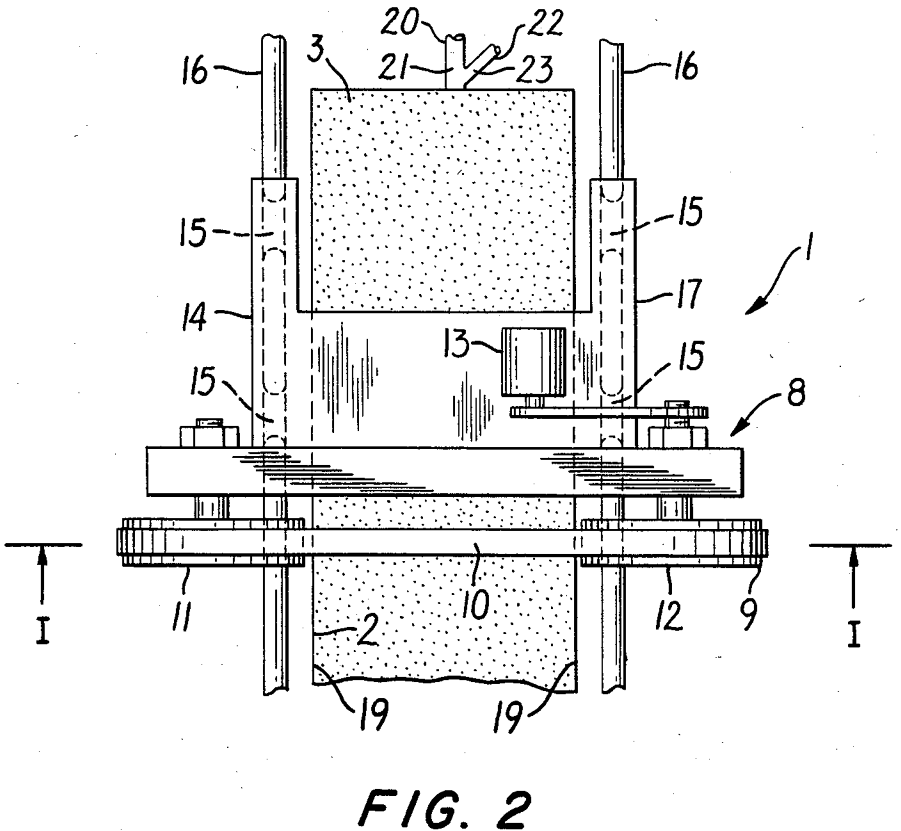
FIG. 2 shows, in top plan view, the arrangement shown in FIG. 1.

FIGS. 1 and 2 show an arrangement 1 in accordance with the invention. This arrangement comprises a tank 2 of elongated shape, arranged horizontally in lengthwise direction. Within the tank 2 there is contained a material 3 which is to be cut into strips. As an example, this material 3 may be a block of natural rubber originally obtained directly in the tank 2 by coagulation of a latex introduced into the tank 2. The known means for obtaining this latex coagulum comprise, for instance, a conduit 20 for latex 21 which enters into one end of the tank 2 and a conduit 22 for coagulating agent 23, said agent being, in particular, formic acid, acetic acid or a biological agent. For purposes of homogenization, the coagulating-agent conduit 22 discharges into the latex conduit 20 (FIG. 2). It goes without saying that other means of obtaining the coagulum block 3 are possible.

The arrangement 1 comprises a conduit 4 for introducing a fluid 5 into the tank 2, the fluid 5 being, for instance, water and this inlet of fluid being controlled by the valve 6 (FIG. 1). The water 5 is caused to enter the tank 2 in such a manner that the fluid 5 is directly in contact with the material 3, which thus floats in the water and has a portion 7 which is located above the water. The coagulum 3 floats in the water since its density varies in practice between 0.6 and 0.9 g/cc.

The arrangement 1 has means 8 adapted to cut strips from the emergent portion 7. These means comprise a saw 9 with a band 10 wound around two wheels 11, 12, this band 10 being preferably without teeth. The wheel 12 is driven by the motor 13. The assembly consisting of the wheels 11, 12 and the motor 13 is fastened on a frame 14 which in its turn is mounted on four wheels 15 which travel on two horizontal rails 16 arranged along the upper portion of the tank 2 on opposite sides of the tank 2. The frame 14 and the wheels 15 therefore constitute a carriage 17 which is movable horizontally above the tank 2 over its entire length by means of a drive motor (not shown). The lower portion 10A of the band 10 is of horizontal orientation and makes it possible to cut a strip 18 from the emergent portion 7 due to the displacement of the carriage 17.

When the strip 18 has been cut off, it is shifted laterally by known means which, for purposes of simplification, have not been shown in the drawing, these means comprising, for instance, a conveyor belt or a flotation tank. A further quantity of water 5 is then introduced into the tank 2 so that the emergent portion 7 reaches the same level as it previously had and a new strip 18 is cut out.

The thickness "e" of the strips is determined by the amount of water introduced into the tank 2 before each cutting. This thickness "e" may be regulated by varying the density of the fluid 5, for instance, by using a fluid heavier than pure water and compatible with the material 3, and particularly by using a feed of salt water (not shown in the drawing). The thickness "e" may also be adjusted by modifying the height of the lower portion 10A of the band 10 by known means, not shown in the drawing, this adjustment in height being obtained, for instance, by vertically displacing the wheels 11, 12.

The last strip may consist, for instance, of the remainder of the block 3 in the tank 2, after the end of the cutting.

The opposite sidewalls 19 of the tank 2 which are arranged parallel to the rails 16 diverge preferably from each other in upward direction thus forming an angle $\alpha$ so as to facilitate the upward movements of the block 3. This angle α preferably has a value such that the walls 19 retain their guide role during all the successive cuttings. The angle α which these walls 19 form varies, for instance, from 2° to 10°, and preferably from 2° to 5°. The distance between the walls 19 and the material 3 has been exaggerated in FIG. 1 in order to make the drawing clearer.

The advantages obtained by the arrangement 1 are as follows:

(a) The cutting is effected without handling the material 3 so that no crushing of the material takes place despite the flexible, non-resistant structure of the coagulum. It is, therefore, possible to effect the cutting of these strips from thick blocks obtained by coagulation of the latex in tanks 2 which are in practice as deep as desired. Thus, for instance, the cutting of strips is effected on blocks of about 25 m in length, 60 cm in width and 1 m in thickness, namely, a total weight of the blocks of about 15 tons, these blocks being obtained in tanks 2 which have practically the same dimensions as the blocks. The thickness of the blocks corresponds practically to the depth of the corresponding tanks. In the event that the walls 19 of the tank 2 form an angle α which is other than zero, the width of the tank is determined at the level of its half depth. For example, the known techniques for the direct obtaining of strips by coagulation give blocks of only about 1.5 tons. The invention, therefore, makes it possible to reduce the areas necessary for the latex coagulation installations by a factor of about 10, which obviously results in considerably reduced investments and operating expenses. The above figures concerning the carrying out of the invention are furthermore given merely by way of example and in fact one can contemplate tanks having a depth which is definitely greater than 1 m and of a length which may be far greater than 25 m. The width of the blocks may be any desired value, since it is limited only by the structure of the cutting means.

(b) The invention makes it possible to treat thick blocks, that is to say blocks having a small ratio of surface to volume. The oxidation of the surface of the coagulum by the air is thus considerably reduced. This advantage combined with the practically complete absence of crushing upon the cutting leads to a rubber, the quality of which is both uniform and satisfactory.

(c) The invention makes it easily possible to vary as desired the thickness "e" of the strips 18 and to do so within wide limits, the most commonly employed thickness "e" varying, for instance, from 10 cm to 20 cm.

Figure 3:
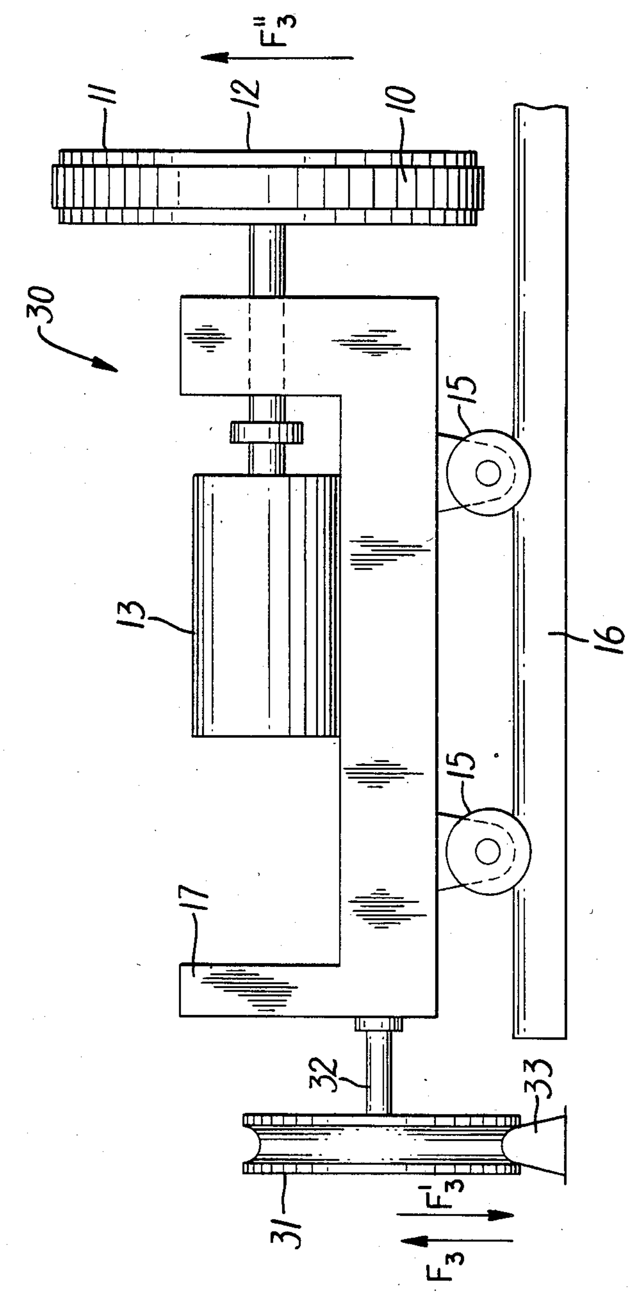
FIG. 3 shows a side elevational view of another arrangement in accordance with the invention.

FIG. 3 shows another arrangement 30 in accordance with the invention. This arrangement comprises a roller 31 mounted at the rear of the carriage 17, i.e., at the end of the carriage 17 opposite the wheels 11, 12. This roller 31 is mounted on the carriage 17 by means which make it possible to adjust the height of the roller 31, these means, for instance, being a vertically movable shaft 32. The vertical movements of the roller 31 are indicated schematically by the arrows $F_3$, $F'_3$.

The operation of the arrangement 30 is as follows: The carriage 17 being at one end of a tank 2, the roller 31 is lowered in such a manner that it comes onto a rail 33 which is, for instance, perpendicular to the rails 16, the shaft 32 of the roller 31 being then parallel to the rails 16. The end of the carriage 17 at which the wheels 11, 12 are located is then lifted or tilted so as to disengage the wheels 15 from the rails 16, this movement being indicated diagrammatically by the arrow $F''_3$. This lifting or tilting can be effected, for instance, manually or by mechanical means, not shown in the drawing, for instance, by a traveling crane. It is then easy to move the carriage 17, by rotation of the roller 31 on the rail 33, so as to place the carriage 17, for instance, over another tank 2 in order to effect a new cutting of strips 18.

Of course, the invention is not limited to the embodiments which have been described above; means other than saws can be contemplated for cutting the strips, for instance, wires, possibly heated wires.

What is claimed is:

1. A method for obtaining strips from a material, characterized by introducing a latex into a tank, coagulating the latex to form a block of latex coagulum, introducing a fluid into the tank to cause the block to float in the fluid and cutting the block into strips from an emergent portion of the floating block.

2. A method according to claim 1, characterized by thickness of the strips is regulated by the amount of fluid in which the block is floated.

3. A method according to claim 1, characterized by thickness of the strips is regulated by the density of the fluid.

4. A method according to claim 1, characterized by thickness of the strips is regulated by the height at which the cutting is effected.

5. A method according to claim 1, characterized by the fluid is a liquid.

6. A method according to claim 1, characterized by the latex is a natural rubber latex.

* * * * *